United States Patent
Ohba et al.

(10) Patent No.: US 9,919,730 B2
(45) Date of Patent: Mar. 20, 2018

(54) STEERING DEVICE AND VEHICLE INCLUDING THE SAME

(71) Applicant: NTN CORPORATION, Osaka (JP)

(72) Inventors: Hirokazu Ohba, Shizuoka (JP); Tomomi Ishikawa, Shizuoka (JP); Taisuke Igi, Shizuoka (JP); Yuya Yamaguchi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 41 days.

(21) Appl. No.: 14/908,786

(22) PCT Filed: Jul. 15, 2014

(86) PCT No.: PCT/JP2014/068793
§ 371 (c)(1),
(2) Date: Jan. 29, 2016

(87) PCT Pub. No.: WO2015/016059
PCT Pub. Date: Feb. 5, 2015

(65) Prior Publication Data
US 2016/0167698 A1 Jun. 16, 2016

(30) Foreign Application Priority Data

Jul. 31, 2013 (JP) ................................. 2013-158876
Mar. 26, 2014 (JP) ................................. 2014-063835

(51) Int. Cl.
*B62D 3/12* (2006.01)
*B62D 5/04* (2006.01)
(Continued)

(52) U.S. Cl.
CPC ............ *B62D 3/126* (2013.01); *B60K 7/0007* (2013.01); *B62D 5/0421* (2013.01); *B62D 7/14* (2013.01);
(Continued)

(58) Field of Classification Search
CPC ................................ B62D 7/14; B62D 7/1509
See application file for complete search history.

(56) References Cited

U.S. PATENT DOCUMENTS 3,279,813 A * 10/1966 Linsay ................. B62D 7/1509
180/410
4,630,701 A * 12/1986 Venetjoki ................. B62D 3/12
180/209

(Continued)

FOREIGN PATENT DOCUMENTS

| CN | 102730052 | 10/2012 |
|---|---|---|
| JP | 63-173766 | 7/1988 |

(Continued)

OTHER PUBLICATIONS

Office Action dated Feb. 28, 2017 in corresponding Chinese Application No. 201480043099.1, with Partial English Translation.
(Continued)

*Primary Examiner* — Kevin Hurley
(74) *Attorney, Agent, or Firm* — Wenderoth, Lind & Ponack, L.L.P.

(57) ABSTRACT

A steering device includes tie rods connected to right and left wheels, and rack bars connected to the respective tie rods. The steering device is capable of simultaneously steering the right and left wheels to the right or left of the vehicle, by moving the rack bars to the right or left. A rack bar moving arrangement is provided which is capable of moving the rack bars in opposite directions by the same distance, and rack teeth are arranged along the opposite directions. The rack bar moving arrangement includes a synchronizing gear in mesh with the rack bars, and is configured to convert the movement of one of the rack bars in one of the opposite directions to the movement of the other of the rack bars in the other opposite direction, thereby steering the wheels in opposite directions.

16 Claims, 8 Drawing Sheets

(51) Int. Cl.
    *B62D 7/15*     (2006.01)
    *B60K 7/00*     (2006.01)
    *B62D 7/14*     (2006.01)
    *B62D 7/18*     (2006.01)
    *B60K 17/04*     (2006.01)
    *B60K 17/30*     (2006.01)

(52) U.S. Cl.
    CPC .............. *B62D 7/1509* (2013.01); *B62D 7/18* (2013.01); *B60K 17/046* (2013.01); *B60K 17/30* (2013.01); *B60K 2007/0038* (2013.01); *B60K 2007/0092* (2013.01)

(56) References Cited

U.S. PATENT DOCUMENTS

| | | | |
|---|---|---|---|
| 5,082,077 A | | 1/1992 | Holka |
| 5,381,705 A | | 1/1995 | Takahashi |
| 6,070,891 A | * | 6/2000 | Knautz ................... B62D 3/12 280/93.503 |
| 2016/0236710 A1 | * | 8/2016 | Ohba ....................... F16H 19/04 |
| 2017/0151981 A1 | * | 6/2017 | Suzuki ................. B62D 15/029 |

FOREIGN PATENT DOCUMENTS

| | | |
|---|---|---|
| JP | 3-112724 | 5/1991 |
| JP | 4-262971 | 9/1992 |
| JP | 2600374 | 8/1999 |
| JP | 2003-127876 | 5/2003 |
| JP | 2005-297782 | 10/2005 |
| JP | 2007-22159 | 2/2007 |
| JP | 2009-208521 | 9/2009 |

OTHER PUBLICATIONS

International Search Report dated Oct. 21, 2014 in corresponding International Application No. PCT/JP2014/068793 (with English translation).
Written Opinion of the International Search Authority in corresponding International Application No. PCT/JP2014/068793.
Office Action dated Oct. 16, 2017 in Chinese Patent Application No. 201480043099.1, with partial English-language translation of the Office Action.

* cited by examiner

STEERING DEVICE AND VEHICLE INCLUDING THE SAME

TECHNICAL FIELD

This invention relates to a steering device for steering front vehicle wheels or rear vehicle wheels, such steering devices constituting a four-wheel steering mechanism, and a vehicle including such a steering device or devices.

BACKGROUND ART

A steering mechanism known as an Ackerman-Jeantaud steering mechanism includes a steering link mechanism connecting together right and left vehicle wheels (an assembly including a tire, a rim, a hub, an in-wheel motor, etc. is hereinafter referred to as "vehicle wheel" or simply "wheel"), and used to steer the vehicle wheels. This steering mechanism includes tie rods and knuckle arms such that while the vehicle is turning, the right and left wheels move around the same center point.

A steering mechanism including an actuator capable of changing the lengths of the tie rods, the distance between the (right and left) tie rods, or the angles between the respective wheels and the knuckle arms is also known. This steering mechanism allows smooth normal traveling, smooth parallel traveling, and smooth small-radius turning, and is sufficiently responsive (see, for example, JP Patent Publication 04-262971A).

There are also known steering mechanisms disposed, respectively, between the front right and front left wheels and between the rear right and rear left wheels, and each including right and left separate rack bars rotatable about their axes, and a forward-and-reverse switching unit provided between the rack bars. The forward-and-reverse switching unit is capable of transmitting the rotation of one of the rack bars to the other rack bar so that the other rack bar is rotated selectively in one and the other direction. This steering device allows the wheels to form a steering angle of 90 degrees, and allows lateral movement of the vehicle (see, for example, JP Patent Publication 2007-22159A).

A four-wheel steering vehicle is also known including an actuator actuated when the front wheels are steered to steer the rear wheels (see, for example, JP Utility Model Registration 2600374). Another steering mechanism includes a rack housing connecting right and left wheels together, and movable in the fore-and-aft direction to perform toe adjustment of the right and left wheels, thereby improving travel stability (see, for example, JP Patent Publication 2003-127876A).

An ordinary Ackerman-Jeantaud steering mechanism allows smooth normal travel because, during normal traveling, the lines perpendicular, in plan view, to the lines of rotation of the respective wheels (widthwise center lines of the wheels) converge on the center of turning of the vehicle. However, even if it is desired to move the vehicle laterally (parallel movement in the lateral direction with respect to the fore-and-aft direction of the vehicle), it is difficult to steer the wheels in the direction perpendicular to the fore-and-aft direction of the vehicle due to the lengths of the steering links and interference with other members. Also, even if one of the right and left wheels is steered by 90 degrees, the one and the other of the right and left wheels never becomes completely parallel to each other, thus making smooth travel difficult.

In this type of vehicle, the front wheels as the main steered wheels are steerable in a predetermined travel direction, while the rear wheels as the auxiliary steered wheels are arranged parallel to the fore-and-aft direction of the vehicle. Thus, when the vehicle is turned by steering the front wheels, the rear wheels follow different turning circles from those of the front wheels. In particular, while the vehicle is traveling at a low speed, the rear wheels follow circles located inside of the circles followed by the respective front wheels, and while the vehicle is traveling at a high speed, under a centrifugal force, the front wheels follow circles located inside of the circles followed by the respective rear wheels. That is, when the front wheels are steered in the direction in which the vehicle is supposed to be turned, the vehicle cannot be turned in this direction. A vehicle including a four-wheel steering mechanism, which steers not only the front wheels but also the rear wheels, is free of this problem and improves travel stability.

The vehicle with a four-wheel steering mechanism (known as "4WS vehicle") disclosed in JP Patent Publication 04-262971A allows lateral traveling and small-radius turning, of the vehicle. However, since this vehicle include a large number of actuators for changing the lengths of the tie rods, the distance between the (right and left) tie rods, and the angles between the respective wheels and the knuckle arms, control of the actuators is complicated. The mechanism disclosed in JP Patent Publication 2007-22159A is not only complicated in structure, but also a large number of gears are used to steer the wheels by rotating the rack bars, which tends to lead to looseness and makes smooth steering of the wheels difficult.

JP Utility Model Registration 2600374 discloses a conventional four-wheel steering mechanism. While this mechanism allows steering of the rear wheels, but does not enable lateral traveling for the same reasons as set forth above. The mechanism disclosed in JP Patent Publication 2003-127876A enables toe adjustment, but does not allow lateral traveling and small-radius turning.

An object of the present invention is to provide a four-wheel steering vehicle which is capable of moving laterally and turning with a small radius, without using a complicated mechanism.

SUMMARY OF THE INVENTION

In order to achieve this object, the present invention provides a steering device comprising tie rods connected, respectively, to right and left wheels which are constituted by a pair of front wheels of a vehicle or a pair of rear wheels of the vehicle, the tie rods being configured to steer the respective right and left wheels; and a pair of rack bars connected to the respective tie rods. The steering device is capable of simultaneously steering the right and left wheels in one of right and left directions of the vehicle with respect to a direction in which the vehicle travels in a straight line, by moving, together with each other, the pair of rack bars in one of the right and left directions. A rack bar moving arrangement is provided which is capable of moving the pair of rack bars in opposite directions to each other by the same amount of distance, and rack teeth are arranged along the opposite directions.

By connecting the right and left wheels to the pair of rack bars movable to the right and left independently of each other through the respective tie rods, it is possible, during a normal travel mode, to actuate the rack bars as an integral body without giving the driver any feeling different from a conventional steering operation. It is also possible to perform various travel modes such as small-radius turning, pivot turning, and lateral traveling, by moving the rack bars in the opposite directions to each other.

Since the rack bars can be selectively locked together and separated from each other, no complicated mechanism and control is necessary, so that it is possible to reduce the cost of the steering device. In other words, in a four-wheel steering vehicle, it is possible to perform lateral traveling and small-radius turning by steering the front wheels and the rear wheels in the same direction or in the opposite directions.

In this arrangement, the rack bar moving arrangement may include a synchronizing gear in mesh with the pair of rack bars. The arrangement is configured to convert a movement of one of the rack bars in one of the opposite directions to a movement of the other of the rack bars in the other of the opposite directions.

Each of the rack bars may include a synchronizing rack gear which is in mesh with the synchronizing gear, and a steering rack gear configured such that a driving force for moving the corresponding rack bar in one of the opposite directions.

While the synchronizing rack gear and the steering rack gear of each rack bar may be formed integral with other, they are preferably separate members integrally fixed to each other because the latter rack bars are more easily manufactured.

In a preferred arrangement, the rack bar moving means includes a first pinion gear and a second pinion gear which are mounted directly, or indirectly through another member, to a steering shaft. The first pinion gear is in mesh with the (first) one of the rack bars, and the second pinion gear is in mesh with the other (second) one of the rack bars. The rack bar moving arrangement is movable to a position where the rotation of the steering shaft is transmitted only to the (first) one of the rack bars through the first pinion gear.

In another preferred arrangement, the rack bar moving arrangement include a first pinion gear and a second pinion gear which are mounted directly, or indirectly through another member, to an actuator configured to be actuated when a steering of the vehicle is operated. The first pinion gear is in mesh with the (first) one of the rack bars, and the second pinion gear is in mesh with the other (second) one of the rack bars. The rack bar moving arrangement is movable to a position where a movement of the actuator is transmitted only to the (first) one of the rack bars through the first pinion gear.

A coupling mechanism may be provided between the first pinion gear and the second pinion gear, and be configured such that the first pinion gear and the second pinion gear can be selectively coupled to and uncoupled from each other through the coupling mechanism. With this arrangement, it is possible to easily change between the state in which the rack bars are moved together with each other in one of the right and left directions and the state in which the rack bars are moved separately in the respective opposite directions, by selectively coupling together the first and second pinions gears and uncoupling them from each other.

If the right and left wheels are steerable about the axes of respective kingpins supported by a frame, with the rack bars coupled to each other through the first and second pinion gears by the coupling mechanism, by moving the rack bars together with each other in one of the right and left directions of the vehicle, it is possible to simultaneously steer the right and left wheels in the same direction about the axes of the respective kingpins.

Also, with the first and second pinion gears uncoupled from each other by the coupling mechanism, by moving the rack bars in the respective opposite directions, the right and left wheels can be steered in opposite directions to each other about the axes of the respective kingpins.

The steering device may be used at least either for the front right and front left wheels of a vehicle or for the rear right and rear left wheels of the vehicle.

In such a vehicle, by moving the rack bars together with each other in one of the right and left directions, ordinary steering of the wheels is possible. By moving the rack bars in the respective opposite directions (i.e. in the right and left directions, respectively), the vehicle can be moved laterally, turned with a small radius, or pivot-turned. It is also possible to improve travel stability, and various other advantages are expected.

These functions are especially effective if in-wheel motors are mounted in the wheels to which the steering device is connected. In a conventional arrangement in which the wheels are driven not by in-wheel motors but by an engine or an electric motor mounted in the hood (through constant-velocity joints), the working angles tend to be limited (normally to 50 degrees or less). Thus, by providing the in-wheel motors, it is possible to perform travel patterns which were impossible in the conventional structure disclosed in JP Patent Publication 2003-127876A.

In any of these arrangements, a configuration may be utilized in which an in-wheel motor is mounted to at least one of the right and left wheels to which the steering device is connected. The right and left wheels are steerable about axes of respective kingpins supported by a frame, and the vehicle is configured such that the rack bars are moved in the respective opposite directions. Thus, the right and left wheels are steered about the axes of the respective kingpins.

With this arrangement, it is possible to utilize a configuration in which the steering forces are assisted by applying suitable torque to the wheels from the respective in-wheel motors. For example, if the wheels move along a plane during steering (namely if, for example, the wheels are moved in the lateral direction along the road surface, instead of being steered without moving), this configuration is especially preferable.

Advantages of the Invention

By connecting the right and left wheels to the pair of rack bars movable to the right and left independently of each other through the respective tie rods, it is possible during a normal travel mode to actuate the rack bars as an integral body without giving the driver any feeling different from a conventional steering operation, and to perform various travel modes such as small-radius turning, pivot turning, and lateral traveling, by moving the rack bars in the opposite directions to each other. Since the rack bars can be selectively locked together and separated from each other, no complicated mechanism and control is necessary, so that it is possible to reduce the cost of the steering device. That is, in a four-wheel steering vehicle, it is possible to perform lateral traveling and small-radius turning by steering the front wheels and the rear wheels in the same direction or in the opposite directions.

DETAILED DESCRIPTION OF THE INVENTION

An embodiment of the present invention is described below with reference to the drawings. In the embodiment, two steering devices according to the present invention are used for a vehicle 1 including in-wheel motors M mounted in the rims of all of the front right, front left, rear right, and rear left wheels w. The in-wheel motors M allow various travel patterns.

Figure 1:
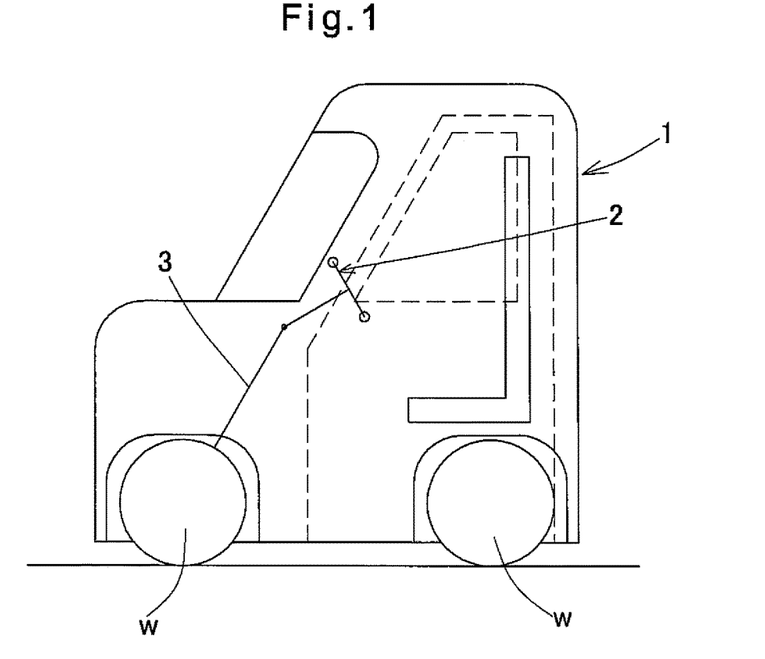
FIG. 1 shows a vehicle using steering devices embodying the present invention.

FIG. 1 shows the vehicle 1, in which the steering devices of the embodiment are used. This vehicle is an ultra-small (laterally arranged) two-seater mobility vehicle. The vehicle is configured such that by operating a steering wheel 2, the wheels w can be steered through a steering shaft 3. The present invention is not only applicable to such an ultra-small mobility vehicle but also to an ordinary vehicle.

Figure 2:
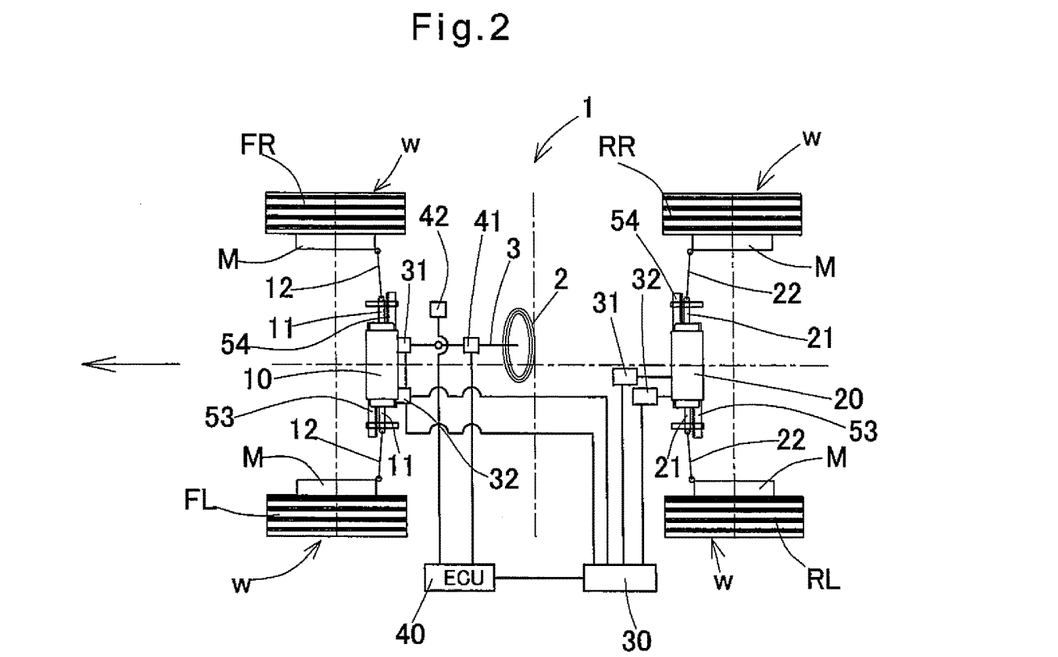
FIG. 2 is a plan view of the vehicle of FIG. 1.

FIG. 2 is a schematic plan view of the vehicle of the embodiment showing its drive line and control line. One of the steering devices, i.e. the first steering device 10 is coupled to the front right wheel FR and the front left wheel FL through tie rods 12, while the second steering device 20 is coupled to the rear right wheel RR and the rear left wheel RL through tie rods 22.

The first steering device 10 for the front wheels allows normal steering of the vehicle according to the operation of the steering wheel 2. The second steering device 20 for the rear wheels allows steering of the vehicle according to the travel mode by actuators such as motors. The steering devices 10 and 20 thus constitute a four-wheel steering mechanism.

One of these steering devices 10 and 20 according to the present invention may be omitted. If the steering device 10 for the front wheels is omitted, a conventional ordinary steering device may be coupled to the front wheels.

Each of the steering devices 10 and 20 for the front wheels and the rear wheels includes a first rack bar 53 connected to the left wheel w, with respect to the fore-and-aft direction of the vehicle, and a second rack bar 54 connected to the right wheel, to steer the right and left wheels. In each of FIGS. 2 to 6, the arrow on its left-hand side indicates the forward direction of the vehicle.

For each of the steering devices 10 and 20, the first and second rack bars 53 and 54 are connected to the right and left wheels w by connecting members 11, 21 hingedly connected to the wheels through the tie rods 12, 22. Knuckle arms or other members are disposed between the tie rods 12 and 22 and the respective wheels w.

Figure 7:
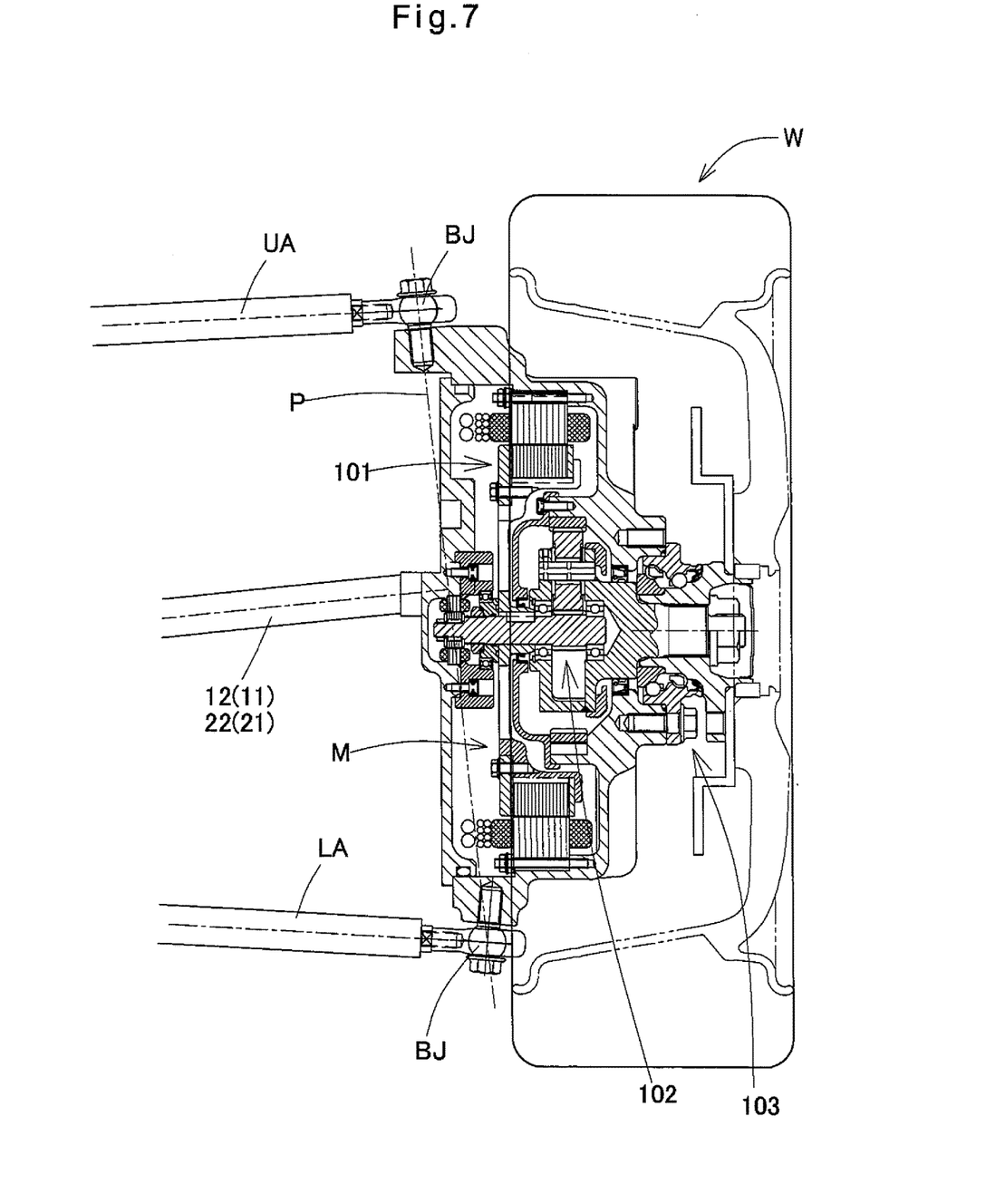
FIG. 7 is a sectional view of a wheel showing how the wheel is supported.

FIG. 7 shows how each tie rod 12, 22 is connected to the corresponding wheel w, in which is mounted the in-wheel motor M. Any of the wheels w is steerable about a kingpin axis P connecting the center axes of ball joints BJ provided at the distal ends of an upper arm UA and a lower arm LA which are supported by the vehicle frame. The in-wheel motor M includes a motor main body 101, a speed reducer 102, and a wheel bearing 103 which are arranged in series in this order from the inboard to outboard side of the vehicle.

Figure 8:
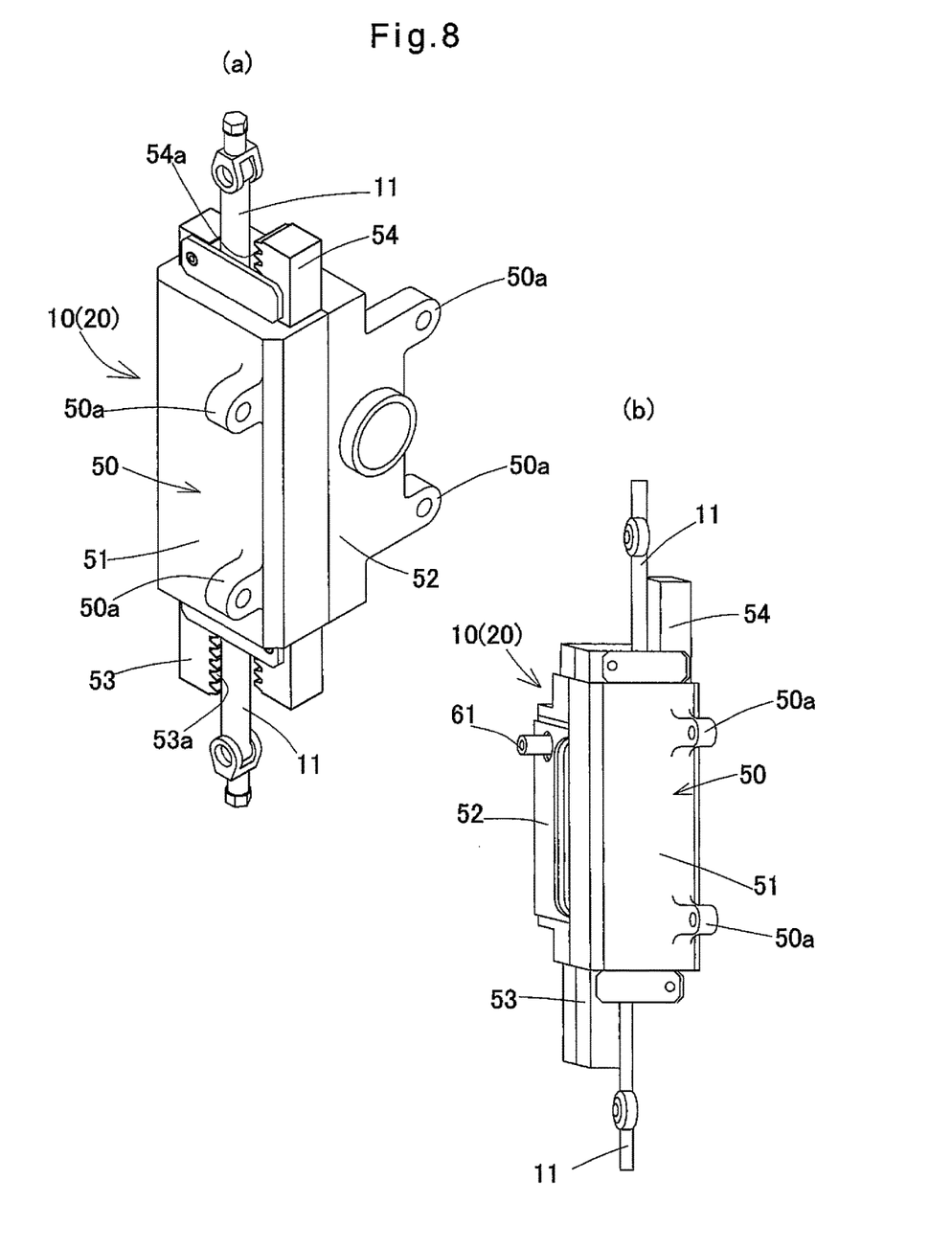
FIGS. 8(a) and 8(b) are perspective views of a steering device, showing its outer appearance.

For each of the steering devices 10 and 20, as shown in FIG. 8, the first and second rack bars 53 and 54 are mounted in a rack case (steering cylinder) 50 extending in the right-and-left direction of the vehicle relative to the direction in which the vehicle moves in a straight line (fore-and-aft direction of the vehicle). The rack case 50 is supported by the frame (chassis), not shown, of the vehicle 1.

The rack case 50 may be supported by the vehicle 1 by directly or indirectly fixing flanges of the rack case 50 to the frame of the vehicle 1 by screws or bolts.

The first rack bar 53 and the second rack bar 54 are movable together with each other in the rack case 50, in the right-and-left direction of the vehicle relative to the direction in which the vehicle moves in a straight line. A normal steering actuator 31 causes this movement based on the operation of the steering wheel 2 by the driver. This movement causes the corresponding right and left wheels to be steered in the right direction or in the left direction.

Each of the steering devices 10 and 20 includes a rack bar moving arrangement 60. The rack bar moving arrangement 60 is capable of moving the first and second rack bars 53 and 54, respectively, in one and the other of the right and left directions (i.e., opposite left and right directions) relative to the direction in which the vehicle moves in a straight line (i.e. the opposite directions in which the rack teeth are arranged) by the same distance, or moving both the first and second rack bars 53 and 54 in one of the right and left directions.

Figure 9:
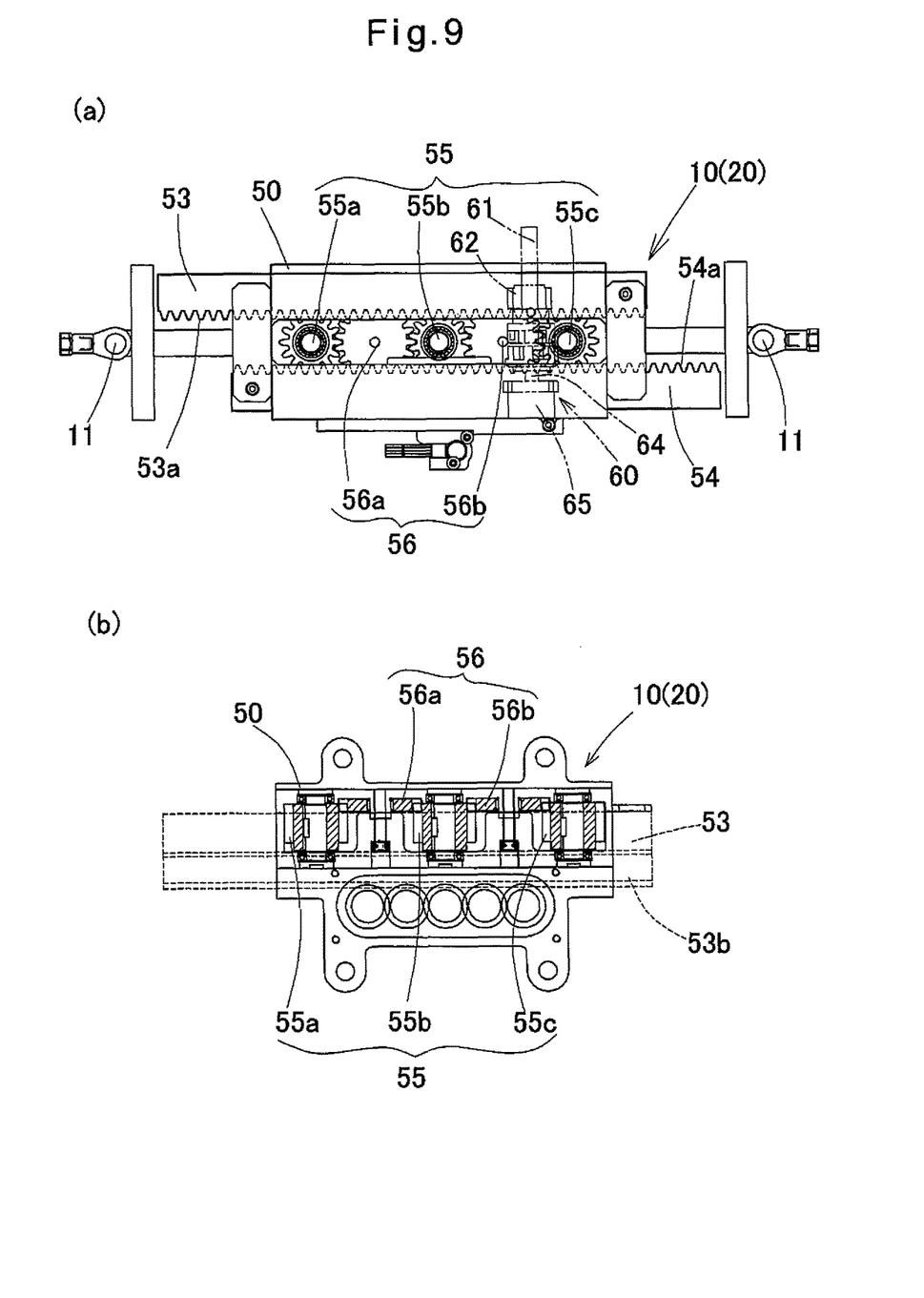
FIGS. 9(a) and 9(b) are a plan view and a front view, respectively, of the steering device, showing its interior.

As shown in FIG. 9(a), the rack bar moving arrangement 60 includes first synchronizing gears 55 each meshing with both a synchronizing rack gear 53a of the first rack bars 53 and a synchronizing rack gear 54a of the second rack bar 54, which faces the synchronizing rack gear 53a.

The first synchronizing gears 55 comprise three gears 55a, 55b and 55c that are arranged along the direction of the rack teeth of the rack gears of the rack bars 53 and 54 and are spaced apart from each other at regular intervals. The first synchronizing gears 55 are configured such that when the first rack bar 53 is moved in one of the opposite directions in which the rack teeth are arranged under a driving force applied from the rack bar moving arrangement 60, the first synchronizing gears 55 convert this movement to the movement of the second rack bar 54 in the other opposite direction. The first synchronizing gears 55 may be configured such that the first and second rack bars 53 and 54 are moved by the same distance in the opposite directions.

The rack bar moving arrangement 60 further includes second synchronizing gears 56 comprising gears 56a and 56b which are disposed between the adjacent first synchronizing gears 55, i.e. between the gears 55a and 55b and between the gears 55b and 55c, respectively. The second synchronizing gears 56 are in mesh with neither of the synchronizing rack gear 53a of the first rack gear 53 and the synchronizing rack gear 54a of the second rack gear 54, and are in mesh with only the first synchronizing gears 55. The second synchronizing gears 56 serve to rotate the three first synchronizing gears 55a, 55b and 55c by the same angle in one same circumferential direction. The second synchronizing gears 56 ensure smooth relative movement between the first rack bar 53 and the second rack bar 54.

The first and second rack bars 53 and 54 include, besides the synchronizing rack gears 53a and 54a, steering rack gears 53b and 54b, respectively.

The synchronizing rack gear 53a, 54a and the steering rack gear 53b, 54b, of each of the first and second rack bars 53 and 54 may be separate members from each other that are fixed together by, e.g., bolts.

Through the steering rack gears 53b and 54b, driving forces for moving the respective rack bars 53 and 54 in one of the opposite directions in which the rack teeth are arranged are applied.

Figure 10:
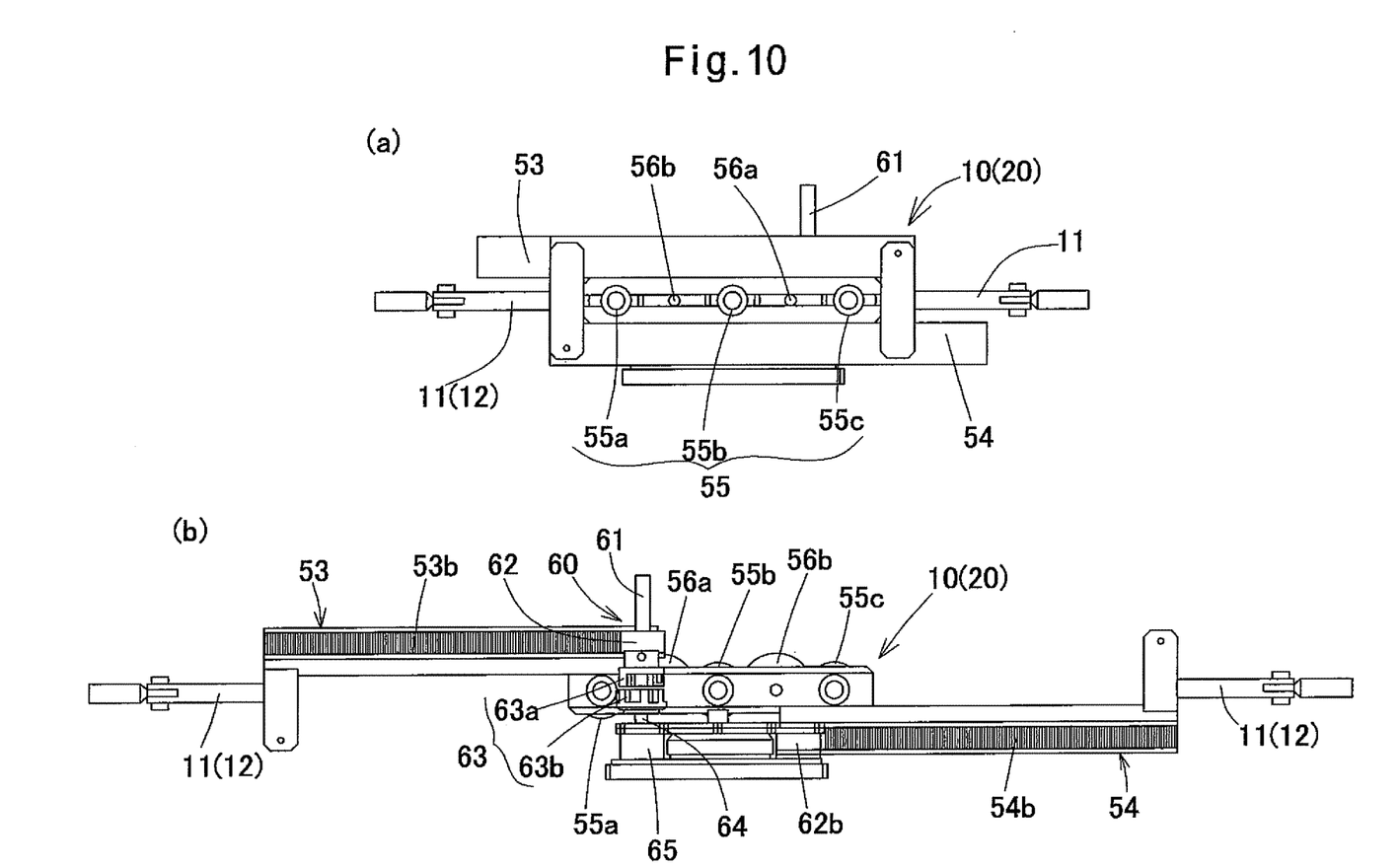
FIGS. 10(a) and 10(b) are plan views of the steering device, showing, respectively, the state in which a pair of rack bars are close to each other, and the state in which the rack bars are opened.

When the first rack bar 53 is moved from the position of FIG. 10(a) to the position of 10(b) under a driving force applied from the rack bar moving arrangement 60, this driving force is applied through the first synchronizing gears 55 to the second rack bar 54, and thus moves the second rack bar 54 from the position of 10(a) to the position of FIG. 10(b). FIG. 10(b) is the view seen from the back side of FIG. 10(a).

The operation of the rack bar moving arrangement 60 is now described.

As shown in FIGS. 11(a) and 11(b), the rack bar moving arrangement 60 of the steering device 10 for the front wheels includes a first rotary shaft 61 configured to be rotated under a driving force of the normal steering actuator 31, shown in FIG. 1, actuated when the steering wheel 2 is turned by a driver, or under a driving force of a mode switching actuator 32 actuated when a mode switching device 42 of the vehicle 1 is operated, and a first pinion gear 62 mounted on the rotary shaft 61 so as to be rotatable together with the first rotary shaft 61. Rotation is transmitted from the actuating shaft of the normal steering actuator 31 or the mode switching actuator 32 to the first rotary shaft 61 through a steering joint.

FIGS. 11(a) and 11(b) also show the rack bar moving arrangement 60 of the steering device 20 for the rear wheels, and thus, this rack bar moving arrangement 60 also includes a first rotary shaft 61 configured to be rotated under a driving force of the normal steering actuator 31 or the mode switching actuator 32 shown in FIG. 1, and a first pinion gear 62 mounted on the rotary shaft 61 so as to be rotatable together with the first rotary shaft 61. Rotation is transmitted from the actuating shaft of the normal steering actuator 31 or the mode switching actuator 32 to the first rotary shaft 61 through the steering joint.

Each rack bar moving arrangement 60 further includes a second rotary shaft 64 aligned with the first rotary shaft 61, and a second pinion gear 65 mounted on the second rotary shaft 64 so as to be rotatable together with the second rotary shaft 64.

FIGS. 8(a) and 8(b) show the entire steering device 10, 20. As shown, the first rack bar 53, the second rack bar 51, etc. are disposed between a front cover 52 and a rear cover 51. While not shown, boots are provided to extend from the tie rods 12, 22 to the rack case 50 to prevent contact of foreign matter with moving parts. The first rotary shaft 61 (pinion shaft) is connected to the actuating shaft of the mode switching actuator 32 through the steering joint.

As shown in FIGS. 11(a) and 11(b), the first pinion gear 62 is in mesh with the steering rack gear 53b of the first rack bar 53, and the second pinion gear 65 is in mesh with the steering rack gear 54b of the second rack bar 54.

The rack bar moving arrangement 60 further includes a coupling mechanism 63 disposed between the first pinion gear 62 and the second pinion gear 65 and configured to selectively uncouple the first and second rotary shafts 61 and 64 from each other (so that they can rotate relative to each other) and couple the shafts 61 and 64 together (so that they cannot rotate relative to each other, i.e., rotate together).

The coupling mechanism 63 includes a fixed part 63b provided on the second rotary shaft 64, and a moving part 63a provided on the first rotary shaft 61. The coupling mechanism 63 is configured such that when the moving part 63a is pressed against the fixed part 63a, protrusions 63c formed on the moving part 63a are engaged in recesses 63d formed in the fixed part 63b, thereby allowing the shafts 61 and 64 to rotate together. Conversely to the above, the protrusions 63c may be formed on the fixed part 63b, and the recesses 63d may be formed in the moving part 63a.

The coupling mechanism 63 is further configured such that the moving part 63a can be moved axially away from the fixed part 63b by an external driving source such as a push solenoid until the fixed part 63b and the moving part 63a are uncoupled from each other, and the first and second rotary shafts 61 and 64, and thus the first and second pinion gears 62 and 65, are uncoupled from each other and rotatable independently of each other, as shown in FIGS. 11(a) and 11(b).

In this state, since the first and second pinion gear 62 and 65 are in mesh with the first and second rack bars 53 and 54, respectively, and the first and second rack bars 53 and 54 are in mesh with each other through the first synchronizing gears 55, when the first pinion gear 62 is rotated, and the first rack bar 53 is moved in one of the opposite directions in which the rack teeth are arranged, i.e. one of the right and left directions of the vehicle, the first synchronizing gears 55 rotate, thus moving the second rack bar 54 in the other of the right and left directions by the same distance as the first rack bar 53 is moved. At this time, the second pinion gear 65 is rotated by the second rack bar 54 independently of the first pinion gear 62.

Thus, by selectively coupling together the first and second pinion gears 62 and 65 and uncoupling them from each other, it is possible to either move the rack bars 53 and 54 in one of the right and left directions together with each other, or to move the rack bars 53 and 54 in the opposite directions to each other.

That is, with the first rack bar 53 and the second rack bar 54 coupled together through the first pinion gear 62 and the second pinion gear 65 by the coupling mechanism 63, when a driver turns the steering wheel 2, the first rack bar 53 and the second rack bar 54 are moved together with each other in one of the right and left directions with respect to the direction in which the vehicle is moved in a straight line. As a result, the corresponding right and left wheels w can be steered about the respective kingpin axes P (see FIG. 7) in the same direction. At this time, since the first rack bar 53 and the second rack bar 54 are moved together with each other, the first synchronizing gears 55 do not rotate.

When the first pinion gear 62 and the second pinion gear 65 are uncoupled from each other, it is possible to move the first rack bar 53 and the second rack bars 54 in one and the other of the right and left directions, with respect to the direction in which the vehicle is moved in a straight line, thereby steering the right and left wheels w in opposite directions to each other about the respective kingpin axes P (FIG. 7).

Thus, in this embodiment, when the steering wheel 2 is rotated by a driver, the rotation of the steering wheel 2 is transmitted to the first rotary shaft 3 through the steering shaft 3. During normal operation, the rack bar moving arrangement 60 serves to move the first rack bar 53 and the second rack bar 54 together with each other.

During mode switching, the driving force of the mode switching actuator 32 is transmitted to the respective rack bars 53 and 54 due to rotation of the respective pinion gears 62 and 65. While the driving force of the mode switching actuator 32 is being applied to the respective rack bars 53 and 54 through the pinion gear 62, the rotation of the steering shaft 3 may or may not be transmitted to the steering wheel 2.

The normal steering actuator 31 may have the function of the mode switching actuator 32, too. That is, during mode switching, the rotation of the steering shaft 3 may be transmitted to the first rotary shaft 61 through the normal steering actuator 31.

Also, the in-wheel motors M on both sides of the steering device 10, 20 may be configured and designed to serve as the mode switching actuator 32. Further, the normal steering actuator 31, the mode switching actuator 32 and the right and left in-wheel motors M may be configured and designed to assist each other.

Now description is made of several travel modes of the vehicle in which the steering devices 10 and 20 are mounted.

(Normal Travel Mode)

Figure 11:
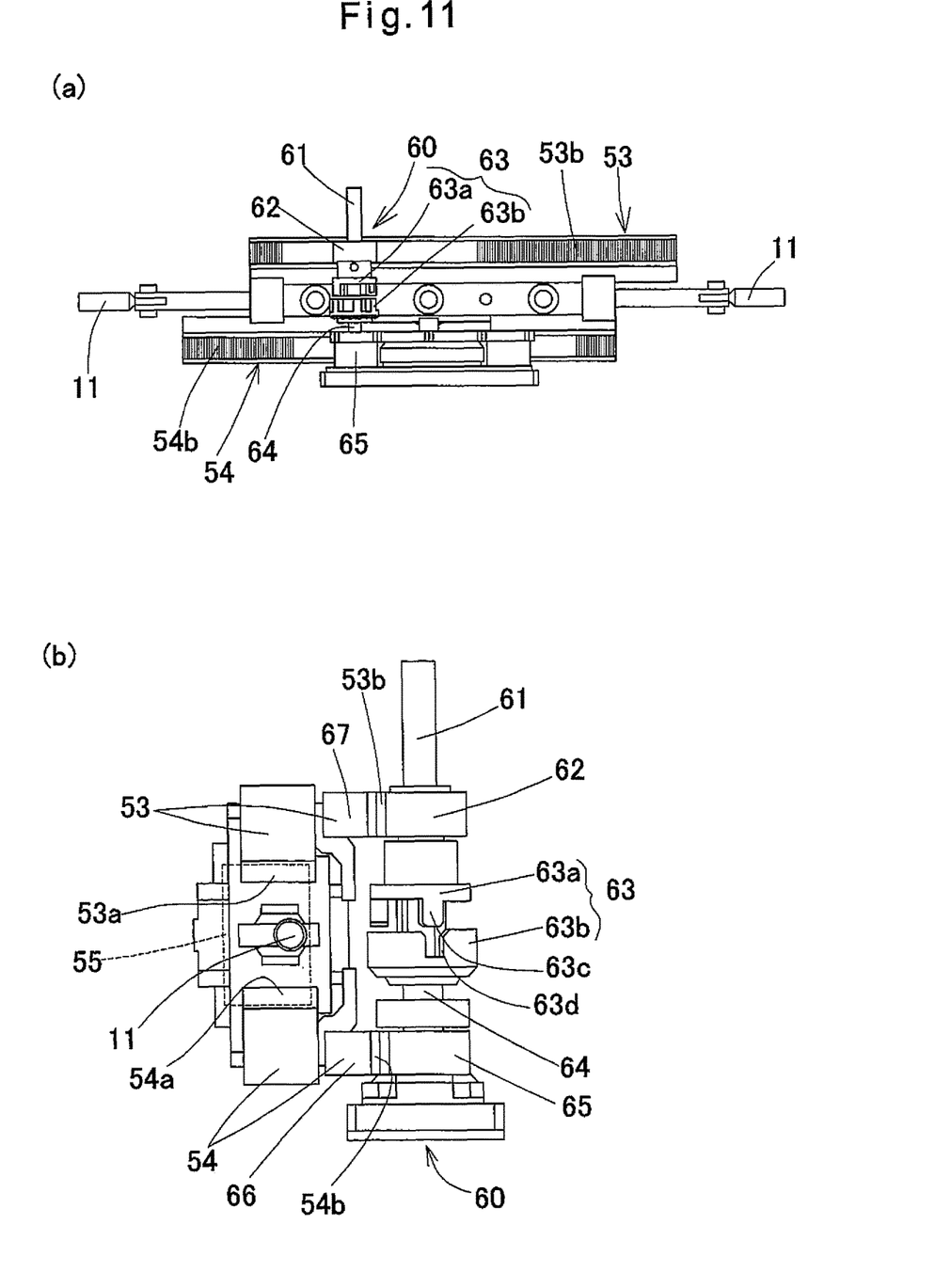
FIGS. 11(a) and 11(b) are front views of the steering device, showing the detailed structure of a rack bar moving means.

With the wheels positioned as shown in FIG. 2, in which the vehicle is supposed to travel in a straight line, the coupling mechanism 63, shown in FIGS. 11(*a*) and 11(*b*), of the steering device 10 for the front wheels is coupled, whereby the first rack bar 53 and the second rack bar 54 are movable together with each other. The members in the rack case 50 of the steering device 10 are thus moved in one of the right and left directions of the vehicle 1 together with each other.

Figure 3:
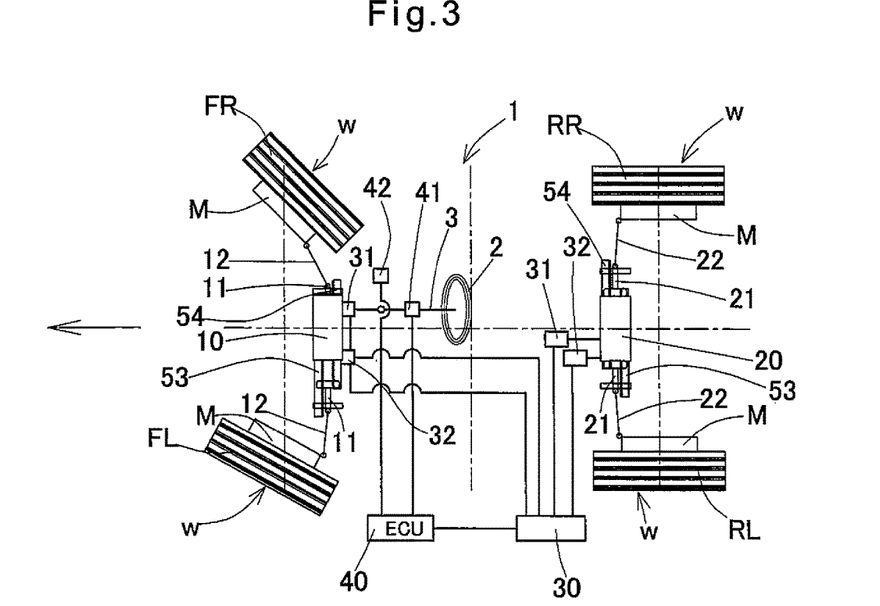
FIG. 3 is a plan view of the vehicle of FIG. 2 during a normal travel mode (normal steering mode).

When the first and second rack bars 53 and 54 of the steering device 10 are moved together with each other in one of the right and left directions with respect to the direction in which the vehicle is moved in a straight line under the driving force of the normal steering actuator 31 or by operating the steering wheel 2, the front right and front left wheels w are steered by a predetermined angle. FIG. 3 shows the state of the vehicle when the front wheels are steered to the right. That is, by completely fixing the rack bars 53 and 54 to each other, the vehicle 1 can travel in the same manner as ordinary vehicles. During the normal travel mode, when a driver operates the steering wheel 2, the front wheels are steered through the steering device 10 for the front wheels such that the vehicle can travel in a straight line, turn right or left, or travel otherwise according to situations.

(Small Radius Turning Mode)

Figure 4:
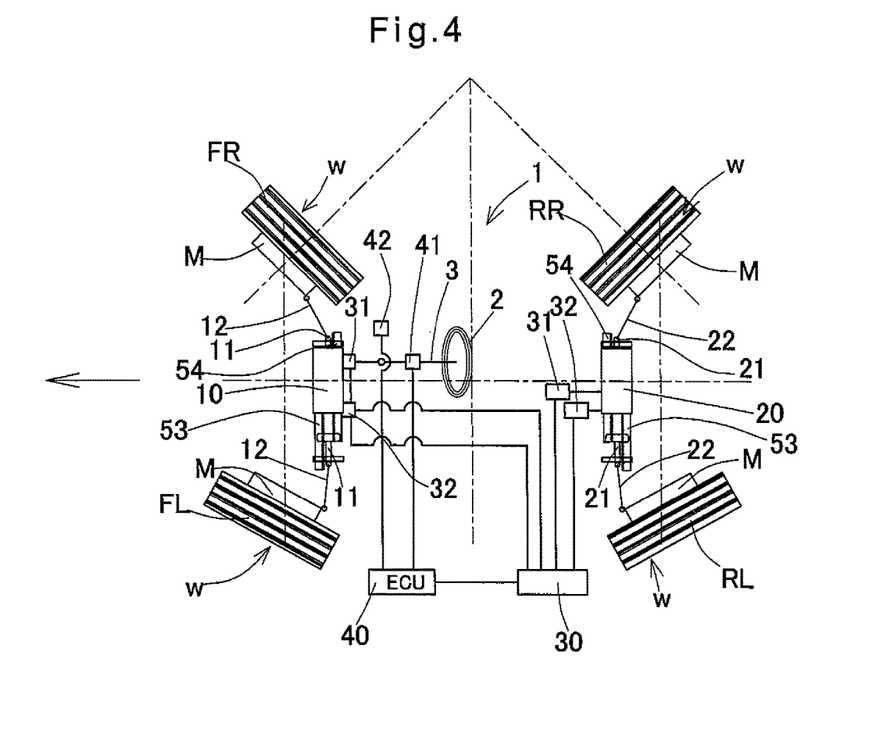
FIG. 4 is a plan view of the vehicle of FIG. 2 during a small-radius turning mode.

FIG. 4 shows a small radius turning mode, in which the steering device 10 for the front wheels is moved as shown in FIG. 3, and further, the coupling mechanism 63, shown in FIGS. 11(*a*) and 11(*b*), of the steering device 20 for the rear wheels is also coupled, whereby the first rack bar 53 and the second rack bar 54 of the steering device 20 are movable together with each other. The members in the rack case 50 of the steering device 20 are thus also moved in one of the right and left directions of the vehicle 1 together with each other.

When the first and second rack bars 53 and 54 of the steering device 20 are moved together with each other in one of the right and left directions with respect to the direction in which the vehicle is moved in a straight line under the driving force of the normal steering actuator 31, the rear right and rear left wheels w are steered by a predetermined angle as shown in FIG. 4. At this time, the rear wheels are steered in the opposite direction to the direction in which the front wheels are steered. (In FIG. 4, the front wheels are steered to the right, while the rear wheels are steered to the left.) This allows the vehicle to be turned with a smaller radius than during the normal travel mode. In FIG. 4, the rear wheels are steered in the opposite direction to the direction in which the front wheels are steered by the same angle as the front wheels, but may be steered by a different angle from the angle by which the front wheels are steered.

(Pivot Turn Mode)

Figure 5:
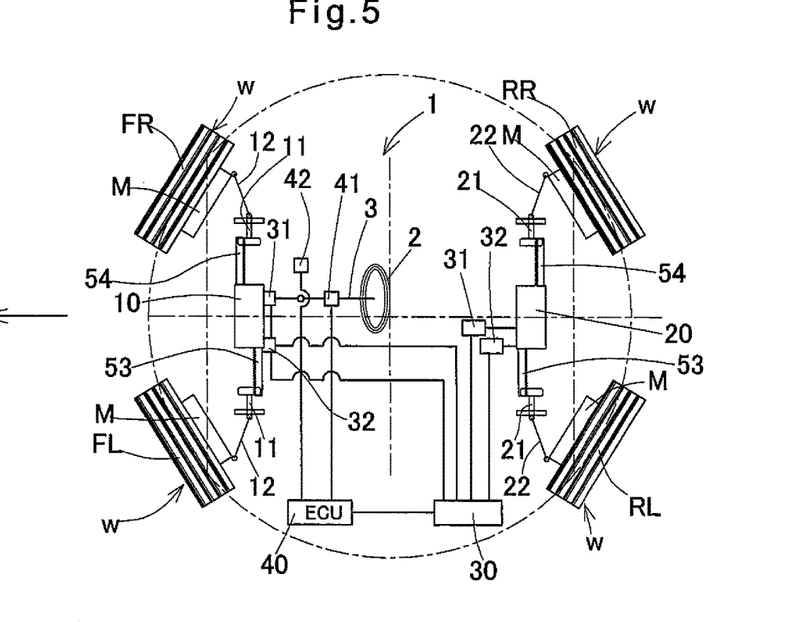
FIG. 5 is a plan view of the vehicle of FIG. 2 during a pivot turn mode.

A pivot turn mode is shown in FIG. 5. In this mode, for each of the steering devices 10 and 20, the coupling mechanism 63 (see FIGS. 11(*a*) and 11(*b*)) is uncoupled, whereby the first rack bar 53 and the second rack bar 54 are movable separately from each other. Thus, when the driving force of the mode switching actuator 32 is applied to the first pinion gear 62, the first rack bar 53 and the second rack bar 54 are moved in opposite directions to each other. In particular, since the synchronizing gears 55 are disposed between the first rack bar 53 and the second rack bar 54, when the first rack bar 53 is moved in one of the right and left directions, the second rack bar 54 is moved in the other of the right and left directions.

The first and second rack bar 53 of each of the steering devices 10 and 20 are moved in the opposite directions to each other until, as shown in FIG. 5, the center axes of all four wheels w substantially extend to the center of the vehicle, and the coupling mechanisms 63 of the respective steering devices 10 and 20 are again coupled in this state. Since the center axes of all four wheels w substantially extend to the center of the vehicle, the vehicle can turn on the same spot (without substantially moving in any direction) under the driving forces from the in-wheel motors M mounted in the respective wheels w.

In this mode, the vehicle can be turned on the same spot not by all of the in-wheel motors M mounted in the respective wheels w but by at least one of them.

(Lateral Travel Mode)

Figure 6:
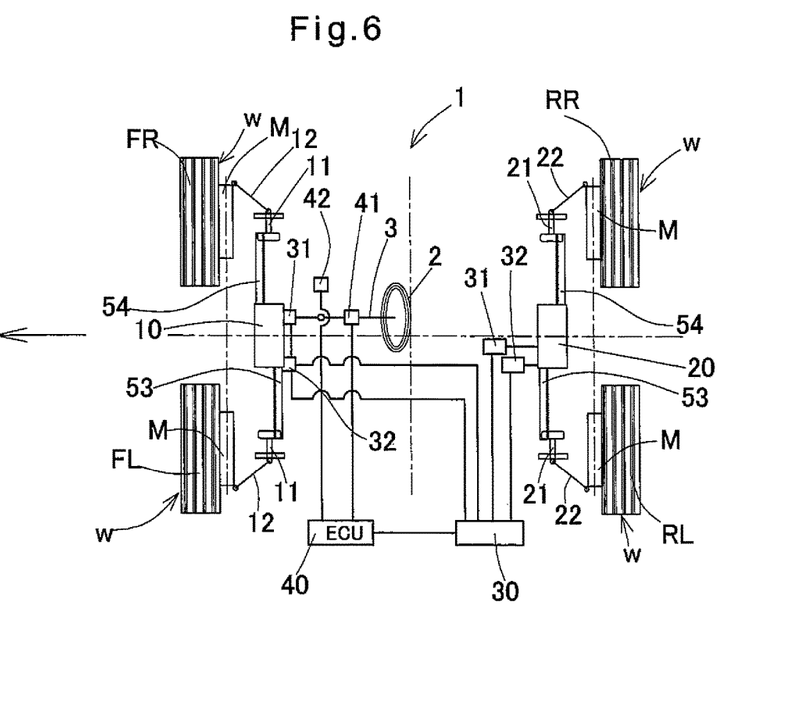
FIG. 6 is a plan view of the vehicle of FIG. 2 during a lateral travel (parallel travel) mode.

A lateral travel mode is shown in FIG. 6. In this mode, as in the pivot turn mode, the coupling mechanism 63 of the respective steering devices 10 and 20 are uncoupled (as shown in FIGS. 11(*a*) and 11(*b*)), and the first and second rack bars 53 and 54 of the respective steering devices 10 and 20 are moved in opposite directions to each other by transmitting rotation from the mode switching actuator 32 to the first pinion gear 62, until all of the front and rear wheels w are turned to face in the direction perpendicular to the direction in which the vehicle travels in a straight line (right-and-left direction with respect to the direction in which the vehicle travels in a straight line). When all of the wheels 2 are turned to face in the perpendicular direction, the coupling mechanisms 63 (FIGS. 11(*a*) and 11(*b*)) are again coupled to fix the rack bars 53 and 54 in position.

In this state, by moving, together with each other, the first and second rack bars 53 and 54 of each of the steering devices 10 and 20 in one of the right and left directions with respect to the direction in which the vehicle travels in a straight line, under the driving force of the normal steering actuator 31 or by operating the steering wheel 2, it is possible to finely adjust the directions (angles) of the wheels w.

FIG. 6 shows the positional relationship between the steering devices 10 and 20 for the front and rear wheels, respectively, and the directions of the wheels w, during the lateral travel mode. Compared to the pivot turn mode, the rack bars 53 and 54 protrude laterally outwardly to a larger degree. Thus, in this mode, the connecting points between the tie rods 12 and 22 and the respective wheels w are located at the outermost positions in the width direction of the vehicle.

During the lateral travel mode too, it is possible to finely adjust the directions (angles) of the wheels w under the driving force of the normal steering actuator 31 or by operating the steering wheel 2.

(Further Travel Mode)

In a further travel mode, when an electronic control unit (ECU) 40 determines that the vehicle 1 is traveling at a high speed, based on an output of the ECU 40, an actuator driver 30 drives the mode switching actuator 32 for the rear wheels such that the rear left and rear right wheels RL and RR are turned from the parallel position so as to be slightly closed at their front ends (toe-in state). This allows stable high-speed travel.

Such toe adjustment may be made based on travel states of the vehicle, such as the vehicle speed and loads on the axles, as determined by the ECU 40, or based on the input from the mode switching unit 42, which is provided in the driver/passenger cabin.

(Mode Switching)

The mode switching unit 42 is also used to switch one of the above travel modes to another. That is, by operating the mode switching unit 42, it is possible to select any of the normal travel mode, pivot turn mode, lateral travel mode, small-radius turning mode, etc. The mode switching unit 42 may be a switch, a lever, a joystick, etc. Since any travel mode is selectable by operating e.g. a switch, the mode switching can be made safely.

During the normal travel mode, the ECU 40 calculates the necessary moving amount of the rack bars 53 and 54 of the steering device 10 in one of the right and left directions, based on information from a sensor 41 when the steering wheel 2 is operated. Based on the results of the calculation, the ECU 40 controls the normal steering actuator 31 for the front wheels to move together with each other, the rack bars 53 and 54 received in the rack case 50 in the one of the right and left directions, thereby steering the front right and front left wheels w by necessary angles in a necessary direction.

When the pivot turn mode is selected by operating the mode switching unit 42, it is possible to steer the four wheels w through the steering devices 10 and 20 for the front and rear wheels, respectively, such that the vehicle 1 turns substantially about the center of the vehicle. This mode is permitted only while the vehicle 1 is at a stop. During the pivot turn mode, the ECU 40 calculates the relative movements of the rack bars 53 and 54 of the respective control devices 10 and 20, and based on the results of calculation, the ECU 40 controls, through the actuator driver 30, the mode switching actuators 30 for the front and rear wheels, thereby steering the wheels.

When the lateral travel mode is selected by operating the mode switching unit 42, it is possible to steer the four wheels w through the steering devices 10 and 20 for the front and rear wheels, respectively, such that the four wheels form a steering angle of 90 degrees. At this time, too, the ECU 40 calculates the relative movements of the rack bars 53 and 54 of the respective control devices 10 and 20. Based on the results of the calculation, the ECU 40 controls, through the actuator driver 30, the mode switching actuators 30 for the front and rear wheels, thereby steering the wheels. The normal steering actuators 31 may be configured, during the lateral travel mode, to be deactivated, or kept activated so that the steering angles can be finely adjusted by the normal steering actuators 31.

When the small-radius turning mode is selected by operating the mode switching unit 42, the front wheels and the rear wheels are steered in opposite directions to each other so that the vehicle can turn with a smaller radius. During the small-radius turning mode, the ECU 40 calculates moving amounts of the rack bars 53 and 54 of the steering device 20 for the rear wheels, which are received in the rack case 50, based on e.g. the operation of the steering wheel 2, and based on the results of calculation, the ECU 40 controls, through the actuator driver 30, the normal steering actuator 31 for the steering device 20 to steer the rear wheels. The steering device 10 for the front wheels is controlled in the same manner as during the normal travel mode.

As described above, based on the steering angle of the steering wheel 2, the information from the sensor 41, which detects e.g. the steering torque, and/or the input from the mode switching unit 42, or based on the travel condition of the vehicle determined by the ECU 40 itself, the ECU 40 calculates necessary moving amounts of the rack bars 53 and 54 of the respective steering devices 10 and 20. Based on the results of the calculation, the ECU 40 controls, through the actuator driver 30, the normal steering actuators 31 or the mode switching actuators 32 of the respective steering devices 10 and 20, thereby steering the front and rear wheels.

In the embodiment, the steering device 20 for the rear wheels is controlled by the steer-by-wire configuration, in which the steering operation as well as the operation of the mode switching actuator 32, which are carried out by a driver, are converted to electric signals to steer the wheels.

For the steering device 10 for the front wheels too, the steer-by-wire configuration using the normal steering actuator 31 and the mode switching actuator 32 may be used. In another arrangement, the normal steering actuator for the steering device 10 comprises a motor coupled to a steering wheel 2, which is operated by a driver, or to the steering shaft 3, and configured to assist the manual steering operation by generating torque necessary to move the rack bars 53 and 54 in the right and left directions. In this arrangement, the mode switching actuator 32 for the front wheels is of the same structure as the actuator 32 for the rear wheels.

The steering device 10 for the front wheels, which is used for steering during the normal travel mode, may be an ordinary steering device using an ordinary mechanical rack and pinion mechanism.

The above-described travel modes are mere examples, and other control modes using the above-described mechanism are feasible.

According to the present invention, during the normal travel mode, steering operation can be made without giving the driver any feeling different from conventional steering operation, and also allows various travel modes including pivot turning, lateral traveling, and small-radius turning. This steering device thus enables lateral traveling, small-radius turning, etc. without using a complicated mechanism and thus at a low cost.

DESCRIPTION OF THE NUMERALS

1. Vehicle
2. Steering wheel
3. Steering shaft (operating shaft)
10, 20. Steering device
11, 21. Connecting member
12, 22. Tie rod
30. Actuator driver
31. Normal steering actuator 32. Mode switching actuator
40. Electric control unit (ECU)
41. Sensor
42. Mode switching means
w. Wheel

What is claimed is:

1. A steering device comprising:
   a pair of tie rods connected, respectively, to right and left wheels of a vehicle, the tie rods being configured to steer the respective right and left wheels;
   a pair of rack bars each having an end connected to a respective one of the tie rods; and
   a rack bar moving arrangement configured to selectively couple and uncouple the rack bars to each other such that:
   (i) the pair of rack bars move together simultaneously in one of the right and left directions of the vehicle with respect to a forward travel direction of the vehicle when the rack bars are coupled so as to allow both the right and left wheels to be steered in one of the right and left directions, and
   (ii) the pair of rack bars move simultaneously in opposite directions away from each other by a same distance when the rack bars are uncoupled so as to allow the right and left wheels to be steered in opposite right and left directions, rack teeth being arranged along the opposite right and left directions.

2. The steering device of claim 1, wherein the rack bar moving arrangement includes a synchronizing gear in mesh with the pair of rack bars, the synchronizing gear being configured to convert a movement of a first one of the rack bars in a first one of the opposite directions to a movement of a second one of the rack bars in a second one of the opposite directions.

3. A vehicle comprising the steering device of claim 1 operably connected to at least one of (i) front right and front left wheels of the vehicle and (ii) rear right and rear left wheels of the vehicle.

4. A steering device comprising:
   a pair of tie rods connected, respectively, to right and left wheels of a vehicle, the tie rods being configured to steer the respective right and left wheels;
   a pair of rack bars each having an end connected to a respective one of the tie rods, the tie rods and the rack bars being configured to simultaneously steer the right and left wheels in one of a right and left direction of the vehicle with respect to a direction in which the vehicle travels in a straight line by moving the rack bars together in the one of the right and left direction; and
   a rack bar moving arrangement configured to move the pair of rack bars in opposite directions to each other by a same distance, and rack teeth being arranged along the opposite directions;
   wherein the rack bar moving arrangement includes a synchronizing gear in mesh with the pair of rack bars, the synchronizing gear being configured to convert a movement of a first one of the rack bars in a first one of the opposite directions to a movement of a second one of the rack bars in a second one of the opposite directions;
   wherein each of the rack bars includes a synchronizing rack gear in mesh with the synchronizing gear, and a steering rack gear configured to transmit a driving force for moving a corresponding one of the rack bars in one of the opposite directions.

5. The steering device of claim 4, wherein the synchronizing rack gear and the steering rack gear of each of the rack bars are separate members integrally fixed to each other.

6. The steering device of claim 5, wherein the rack bar moving arrangement includes a first pinion gear and a second pinion gear which are mounted directly, or indirectly through another member, to a steering shaft,
   wherein the first pinion gear is in mesh with the first one of the rack bars, and the second pinion gear is in mesh with the second one of the rack bars, and
   wherein the rack bar moving arrangement is movable to a position where a rotation of the steering shaft is transmitted only to the first one of the rack bars through the first pinion gear.

7. The steering device of claim 5, wherein the rack bar moving arrangement includes a first pinion gear and a second pinion gear which are mounted directly, or indirectly through another member, to an actuator configured to be actuated when a steering of the vehicle is operated,
   wherein the first pinion gear is in mesh with the first one of the rack bars, and the second pinion gear is in mesh with the second one of the rack bars, and
   wherein the rack bar moving arrangement is movable to a position where a movement of the actuator is transmitted only to the first one of the rack bars through the first pinion gear.

8. The steering device of claim 4, wherein the rack bar moving arrangement includes a first pinion gear and a second pinion gear which are mounted directly, or indirectly through another member, to a steering shaft,
   wherein the first pinion gear is in mesh with the first one of the rack bars, and the second pinion gear is in mesh with the second one of the rack bars, and
   wherein the rack bar moving arrangement is movable to a position where a rotation of the steering shaft is transmitted only to the first one of the rack bars through the first pinion gear.

9. The steering device of claim 4, wherein the rack bar moving arrangement includes a first pinion gear and a second pinion gear which are mounted directly, or indirectly through another member, to an actuator configured to be actuated when a steering of the vehicle is operated,
   wherein the first pinion gear is in mesh with the first one of the rack bars, and the second pinion gear is in mesh with the second one of the rack bars, and
   wherein the rack bar moving arrangement is movable to a position where a movement of the actuator is transmitted only to the first one of the rack bars through the first pinion gear.

10. A steering device comprising:
    a pair of tie rods connected, respectively, to right and left wheels of a vehicle, the tie rods being configured to steer the respective right and left wheels;
    a pair of rack bars each having an end connected to a respective one of the tie rods, the tie rods and the rack bars being configured to simultaneously steer the right and left wheels in one of a right and left direction of the vehicle with respect to a direction in which the vehicle travels in a straight line by moving the rack bars together in the one of the right and left direction; and
    a rack bar moving arrangement configured to move the pair of rack bars in opposite directions to each other by a same distance, and rack teeth being arranged along the opposite directions;
    wherein the rack bar moving arrangement includes a synchronizing gear in mesh with the pair of rack bars, the synchronizing gear being configured to convert a movement of a first one of the rack bars in a first one of the opposite directions to a movement of a second one of the rack bars in a second one of the opposite directions;

wherein the rack bar moving arrangement includes a first pinion gear and a second pinion gear which are mounted directly, or indirectly through another member, to a steering shaft;

wherein the first pinion gear is in mesh with the first one of the rack bars, and the second pinion gear is in mesh with the second one of the rack bars; and wherein the rack bar moving arrangement is movable to a position where a rotation of the steering shaft is transmitted only to the first one of the rack bars through the first pinion gear.

11. The steering device of claim 10, further comprising a coupling mechanism between the first pinion gear and the second pinion gear, the coupling mechanism being configured to selectively couple and uncouple the first pinion gear and the second pinion gear.

12. The steering device of claim 11, wherein the right and left wheels are steerable about axes of respective kingpins supported by a frame, and the coupling mechanism being configured to move the rack bars together in one of the right and left directions of the vehicle, the rack bars being coupled to each other through the first and second pinion gears by the coupling mechanism so as to simultaneously steer the right and left wheels in a same direction about the axes of the respective kingpins.

13. The steering device of claim 11, wherein the right and left wheels are steerable about axes of respective kingpins supported by a frame, and the coupling mechanism being configured to move the rack bars in the respective opposite directions with the first and second pinion gears uncoupled from each other by the coupling mechanism so as to steer the right and left wheels in opposite directions to each other about the axes of the respective kingpins.

14. A steering device comprising:
a pair of tie rods connected, respectively, to right and left wheels of a vehicle, the tie rods being configured to steer the respective right and left wheels;
a pair of rack bars each having an end connected to a respective one of the tie rods, the tie rods and the rack bars being configured to simultaneously steer the right and left wheels in one of a right and left direction of the vehicle with respect to a direction in which the vehicle travels in a straight line by moving the rack bars together in the one of the right and left direction; and
a rack bar moving arrangement configured to move the pair of rack bars in opposite directions to each other by a same distance, and rack teeth being arranged along the opposite directions;
wherein the rack bar moving arrangement includes a synchronizing gear in mesh with the pair of rack bars, the synchronizing gear being configured to convert a movement of a first one of the rack bars in a first one of the opposite directions to a movement of a second one of the rack bars in a second one of the opposite directions;

wherein the rack bar moving arrangement includes a first pinion gear and a second pinion gear which are mounted directly, or indirectly through another member, to an actuator configured to be actuated when a steering of the vehicle is operated;

wherein the first pinion gear is in mesh with the first one of the rack bars, and the second pinion gear is in mesh with the second one of the rack bars; and wherein the rack bar moving arrangement is movable to a position where a movement of the actuator is transmitted only to the first one of the rack bars through the first pinion gear.

15. The steering device of claim 14, wherein a coupling mechanism is arranged between the first pinion gear and the second pinion gear, the coupling mechanism being configured to selectively couple and uncouple the first pinion gear and the second pinion gear.

16. A vehicle comprising:
front right and front left wheels;
rear right and rear left wheels;
a steering device including:
a pair of tie rods connected, respectively, to right and left wheels of a vehicle, the tie rods being configured to steer the respective right and left wheels;
a pair of rack bars each having an end connected to a respective one of the tie rods, the tie rods and the rack bars being configured to simultaneously steer the right and left wheels in one of a right and left direction of the vehicle with respect to a direction in which the vehicle travels in a straight line by moving the rack bars together in the one of the right and left direction; and
a rack bar moving arrangement configured to move the pair of rack bars in opposite directions to each other by a same distance, and rack teeth being arranged along the opposite directions;
wherein the steering device is operably connected to at least one of (i) the front right and front left wheels, and (ii) the rear right and rear left wheels; and
an in-wheel motor amounted to at least one of the right and left wheels to which the steering device is connected, the right and left wheels being steerable about axes of respective kingpins supported by a frame, and that the steering device is configured such that when the rack bars are moved in the respective opposite directions, the right and left wheels are steered about the axes of the respective kingpins.

* * * * *